US007397874B2

(12) United States Patent
Li et al.

(10) Patent No.: US 7,397,874 B2
(45) Date of Patent: Jul. 8, 2008

(54) METHOD AND DEVICE FOR DETECTING VERTICAL BELL LABORATORIES LAYERED SPACE-TIME CODES

(75) Inventors: Dong Li, Shanghai (CN); Hongwei Yang, Shanghai (CN); Liyu Cai, Shanghai (CN)

(73) Assignee: ALCATEL, Paris (FR)

( * ) Notice: Subject to any disclaimer, the term of this patent is extended or adjusted under 35 U.S.C. 154(b) by 563 days.

(21) Appl. No.: 11/103,618

(22) Filed: Apr. 12, 2005

(65) Prior Publication Data

US 2005/0239509 A1 Oct. 27, 2005

(30) Foreign Application Priority Data

Apr. 13, 2004 (CN) .................... 2004 1 0017647

(51) Int. Cl.
*H04B 7/10* (2006.01)
(52) U.S. Cl. ............... 375/347; 375/267; 375/260; 375/340; 375/350
(58) Field of Classification Search ............ 375/267, 375/260, 340, 299, 308, 347, 350
See application file for complete search history.

(56) References Cited

U.S. PATENT DOCUMENTS

| 7,248,647 | B2 * | 7/2007 | Claussen et al. | 375/308 |
|---|---|---|---|---|
| 2003/0181171 | A1 | 9/2003 | Sim et al. | |
| 2004/0052315 | A1 * | 3/2004 | Thielecke et al. | 375/299 |
| 2004/0141566 | A1 * | 7/2004 | Kim et al. | 375/267 |
| 2004/0151254 | A1 * | 8/2004 | Yang et al. | 375/260 |
| 2006/0067420 | A1 * | 3/2006 | Li et al. | 375/267 |
| 2007/0058757 | A1 * | 3/2007 | Kusume | 375/340 |
| 2007/0153935 | A1 * | 7/2007 | Yang et al. | 375/267 |

OTHER PUBLICATIONS

P. W. Wolniansky et al , "V-Blast: an architecture for realizing very high data rates over the rich-scattering wireless channel", Signals, Systems, and Electronics, 1998, Issue 98, 1998 URSI International Symposium on PISA, Italy, Sep. 29-Oct. 2, 1998, NY, NY, Sep. 29, 19989, pp. 295-300, XP010316748.
C. Shen et al, "Detection algorithm improving V-Blast performance over error propagation" Electronics Letters, IEE Stevenage, GB, vol. 39, No. 13, Jun. 26, 2003, pp. 1007-1008, XP006020538.
C. J. Foschini et al, "Simplified Processing for High Spectral Efficiency Wireless Communication Employing Multi-Element Arrays", IEEE Journal on Selected Areas in Communications, vol. 17, No. 11, Nov. 1, 1999, pp. 1841-1852—XP002336171.

* cited by examiner

*Primary Examiner*—Chieh M. Fan
*Assistant Examiner*—Sudhanshu C. Pathak
(74) *Attorney, Agent, or Firm*—Sughrue Mion, PLLC

(57) ABSTRACT

The present invention discloses a V-BLAST detection method for a MIMO system, including: a first detecting step for acquiring in sequence the old detection components of a transmitting symbol vector with the optimum ordering-successive interference cancellation detection method; a second detecting step for taking the detection component with the highest space diversity degree among the old detection components as a first new lo detection component, and acquiring in sequence the other new detection components of the transmitting symbol vector in an inverse order of the optimum detection order with the optimum ordering-successive interference cancellation detection method; an outputting step for outputting the first new detection component and the other new is detection components as the final detection result. The method according to the invention employs the outer close loop iteration technology to further reduce inter-layer error propagation of V-BLAST. This method has less complexity.

13 Claims, 4 Drawing Sheets

Fig.1 - PRIOR ART

METHOD AND DEVICE FOR DETECTING VERTICAL BELL LABORATORIES LAYERED SPACE-TIME CODES

CROSS-REFERENCE TO RELATED APPLICATIONS(S)

This application is based on the Chinese Patent Application No. 200410017647.1 filed on Apr. 13, 2004, the disclosure of which is hereby incorporated by reference thereto in its entirety, and the priority of which is hereby claimed under 35 U.S.C. §119.

TECHNICAL FIELD

The present application relates to the field of wireless communication, in particular to a method and a device for detecting Vertical Bell Laboratories Layered Space-Time (V-BLAST) codes.

BACKGROUND ART

With the development of wireless communication technology and diversification of information demands, people gradually transfer their attention from pure voice services to multi-media services. However, different from wire communication, wireless communication is restricted by various factors such as spectrum resource, transmission power and multi-path fading, among which the spectrum efficiency becomes a focus of attention because it directly affects the capacity of a wireless communication system.

In order to improve the spectrum efficiency of a wireless communication system, a Multiple Input Multiple Output (MIMO) system is proposed, wherein a plurality of transmitting antennae and a plurality of receiving antennae are used to transmit and receive the signals. FIG. 1 illustrates a MIMO system by taking a V-BLAST scheme with M transmitting antennae and N receiving antennae as an example.

As shown in FIG. 1, there are M transmitting antennae and N receiving antennae in the MIMO system, where $1 < M \leq N$. An information bit stream transmitted by a signal source forms M data sub-streams by channel encoding, constellation modulation and serial/parallel conversion. During the same symbol interval, the parallel M data sub-streams constitute a transmitting symbol vector a. The data sub-streams, which respectively correspond to the components $a_1, a_2, \ldots, a_M$ of the transmitting symbol vector a, are transmitted by M transmitting antennae respectively, and received by N receiving antennae after passing through space channels in a scattering environment. The obtained receiving symbol vector r is transmitted to a signal target after V-BLAST detection, parallel/serial conversion, constellation demodulation and channel decoding. Since the M data sub-streams are transmitted to the channels simultaneously, they occupy the same frequency band. Thereby the capacity and the spectrum efficiency of a wireless communication system can be remarkably improved without bandwidth increasing.

To make a full use of the channel space of a MIMO system, people proposed different schemes of space-time process, among which the most remarkable one is a system model of layered space-time code, i.e. the Vertical Bell Laboratories Layered Space Time (V-BLAST) code, which is proposed in 1998 in an article (hereinafter referred to as D1) titled "V-BLAST: An Architecture for Realizing Very High Data Rates Over the Rich-Scattering Wireless Channel" by Wolniansky, Foschini, Golden and Valenzuela. No code circulation phenomenon appears among the antennae of this V-BLAST. The separation and cancellation method of a receiver is an iteration method that selects the optimum signal-to-noise ratio (SNR) and linearly weights receiving symbol vector, which simplifies the receiving process greatly. Therefore, a MIMO system based on V-BLAST technology increasingly becomes a focus of study.

It can be seen from FIG. 1 that the information transmission of the whole MIMO system based on V-BLAST technology realizes high spectrum efficiency and large capacity via a plurality of transmitting antennae and a plurality of receiving antennae. The key step in the whole processing scheme is the serial/parallel conversion and the V-BLAST detection. However, in a MIMO system based on V-BLAST technology, since V-BLAST codes get in return high band efficiency at the cost of partial diversity gain, the V-BLAST detection method for signal detection used in the receiving side is crucial to the improvement of the performance of the whole system.

The V-BLAST detection method disclosed by the above D1 is a detecting method based on the optimum ordering-successive interference cancellation (Ordering-SIC). Within a symbol time, this method uses $a_1, a_2, \ldots, a_M$ to respectively represent the components of the transmitting symbol vector a transmitted from the transmitting antennae. The receiving symbol vector r corresponding to the transmitting symbol vector may be represented as:

$$r = H \cdot a + v \quad (1)$$

where H is a channel matrix of N×M, $a = (a_1, a_2, \ldots, a_M)^T$ stands for the transmitting symbol vector, i.e. a vector having M rows and 1 column obtained by transposing the vector $(a_1, a_2, \ldots, a_M)$, v is a column vector of N×1, indicating an additive white Gaussian noise.

Furthermore, a detection sequence is set as:

$$S = \{k_1, k_2, \ldots, k_{M-1}, k_M\} \quad (2)$$

wherein $k_1, k_2, \ldots, k_{M-1}, k_M$ is a certain permutation of M, M−1, ..., 2, 1, representing an optimum detection order.

The first decision estimated value $y_{k_1}$ can be firstly obtained by using the aforesaid Ordering-SIC V-BLAST detection method.

$$y_{k_1} = w_{k_1} \cdot r_1 \quad (3)$$

wherein $w_{k_1}$ is a zero-forcing vector, $r_1$ is the first receiving symbol vector of the receiving symbol vector r, the initial value is r per se, then the first decision estimated value $y_{k_1}$ is a linear combination of the zero-forcing vector $w_{k_1}$ and the aforesaid receiving symbol vector r.

Then, a first detection component $\hat{a}_{k_1}$ of the transmitting symbol vector is obtained:

$$\hat{a}_{k_1} = Q(y_{k_1}) \quad (4)$$

wherein $Q(y_{k_1})$ represents the constellation demodulation of the first decision estimated value $y_{k_1}$.

After that, assuming $\hat{a}_{k_1} = a_{k_1}$, $a_{k_1}$ is cancelled from the receiving symbol vector r to obtain the second receiving symbol vector $r_2$:

$$r_2 = r_1 - \hat{a}_{k_1} (H)_{k_1} \quad (5)$$

wherein $(H)_{k_1}$ stands for the $k_1$th column of H, $r_1$ is the first component of the receiving symbol vector r, and the initial value is r per se.

Then, the second receiving symbol vector $r_2$ is used to replace $r_1$, and the above steps (3) to (5) are repeated to obtain the second detection component $\hat{a}_{k_2}$ of the transmitting symbol vector and the third receiving symbol vector $r_3$. The rest may be deduced by analogy till the M-th detection component $\hat{a}_{k_M}$ of the transmitting symbol vector is obtained.

In this method, a key vector is the zero-forcing vector $w_{k_1}$ used in step (3). The methods of calculating the zero-forcing vector $w_{k_1}$ include a minimum means-square error (MMSE) detecting method and a zero-forcing (ZF) detecting method, the latter being simpler.

Below we take the ZF method as an example to explain in detail the steps of calculating zero-forcing vector and performing V-BLAST detection in the Ordering-SIC V-BLAST detection method disclosed by D1.

Fist of all, initialization starts:

$$Making\ G_1 = H^+ \tag{6}$$

$$\tilde{H} = H \tag{7}$$

$$r_1 = r \tag{8}$$

$$i = 1 \tag{9}$$

wherein, $H^+$ represents a Moore-Penrose pseudoinverse matrix of channel matrix H, r is the receiving symbol vector represented by the above equation (1).

After that, iteration steps 1) to 6) are executed as follows:

1) determining the sequence number $k_i$ of detection symbol;

$$k_i = \operatorname*{argmin}_{j \notin \{k_1, \ldots, k_{i-1}\}} \|(G_i)_j\|^2, \tag{10}$$

wherein $(G_i)_j$ represents the j-th row of the matrix $(G_i)$, $\|\ \|^2$ represents 2 Norm of the matrix $(G_i)_j$, $$\operatorname*{argmin}_{j \notin \{k_1, \ldots, k_{i-1}\}} \|(G_i)_j\|^2$$

stands for j corresponding to the minimum value of the target function $\|(G_i)_j\|^2$ in the case that j does not belong to $k_1, \ldots, k_{i-1}$.

2) calculating a zero-forcing vector:

$$w_{k_i} = (G_i)_{k_i} \tag{11}$$

3) calculating the decision estimated value $$y_{k_i} = w_{k_i} r_i \tag{12}$$

4) obtaining the detection component $\hat{a}_{k_i}$ of the transmitting symbol vector a $$\hat{a}_{k_i} = Q(y_{k_i}) \tag{13}$$

5) taking the detection component as a known signal and canceling it from the receiving symbol vector:

$$r_{i+1} = r_i - \hat{a}_{k_i}(H)_{k_i} \tag{14}$$

6) calculating a new initial value used for the next iteration:

$$\tilde{H} = \tilde{H}_{\overline{k}_i} \tag{15}$$

$$G_{i+1} = \tilde{H}^+ \tag{16}$$

$$i = i+1 \tag{17}$$

where $\tilde{H}_{\overline{k}_i}$ represents that the $k_i$ th column of the matrix $\tilde{H}$ is set to zero. It should be noted that the new Moore-Penrose pseudoinverse obtained from the equation (16) is based on the "reduced" H, where the $k_1, k_2, \ldots, k_i$-th columns have already been set to zero. The column that is set as zero corresponds to the component of a as detected, thereby canceling the components of the transmitting symbol vector a which have been detected from the receiving symbol vector. At this time, the system becomes a system of removing transmitting antennae $k_1, k_2, \ldots, k_i$, or equals to a system of $a_{k_1} = \ldots = a_{k_i} = 0$.

This method uses the interference cancellation technology so that the space diversity degrees of the symbols that are detected in sequence are $1, 2, \ldots M$ respectively.

It can be seen from the above Ordering-SIC V-BLAST detection method that this method needs to perform Moore-Penrose pseudoinverse to the channel matrix for M (the number of the transmitting antennae) times, each time obtaining a zero-forcing vector, and then carrying out an ordering operation. Therefore, this method is relatively complicated in case of comparatively many transmitting antennae. In addition, the performance of error ratio of the method is much restricted due to error propagation between layers of V-BLAST.

On the basis of the aforesaid Ordering-SIC V-BLAST detection method, an improved detection method was proposed in an article titled "Detection algorithm improving V-BLAST performance over error propagation" (hereinafter referred to as D2) by Cong Shen, Hairuo Zhuang, Lin Dai and Shidong Zhou in 2003.

First of all, in this method, the Ordering-SIC V-BLAST detection method disclosed by D1 is used to detect, with respect to a transmitting symbol vector a of a V-BLAST system having M transmitting antennae and N receiving antennae, M detection components that are respectively represented as $\hat{a}_M^0, \hat{a}_{M-1}^0, \ldots, \hat{a}_2^0, \hat{a}_1$. Here the optimum detection order is assumed to be $M, M-1, \ldots, 1$.

After that, iteration steps begin. In the first loop of this iteration steps, the detection component $\hat{a}_1$ with the highest space diversity degree among the detection components of the current transmitting symbol vector a is cancelled from the receiving symbol vector as a known signal, then the residual $(M-1, N)$ system with $M-1$ transmitting antennae and N receiving antennae is further detected using the Ordering-SIC V-BLAST detection method to obtain the first detection estimate $\hat{a}_M^1, \hat{a}_{M-1}^1, \ldots, \hat{a}_2^1$ of the transmitting symbol vector a. The first detection estimate together with the above known signal $\hat{a}_1$ forms the first update estimate $\hat{a}_M^1, \hat{a}_{M-1}^1, \ldots, \hat{a}_2^1, \hat{a}_1$. The first loop ends.

Then, the second loop is executed. In the second loop, both the signal $\hat{a}_1$ and the signal $\hat{a}_2^1$ with the highest space diversity degree among the detection estimate $\hat{a}_M^1, \hat{a}_{M-1}^1, \ldots, \hat{a}_2^1, \hat{a}_1$ are cancelled from the receiving symbol vector as known signals, then the residual $(M-2, N)$ system with $M-2$ transmitting antennae and N receiving antennae is further detected using the Ordering-SIC V-BLAST detection method to obtain the second detection estimate $\hat{a}_M^2, \hat{a}_{M-1}^2, \ldots, \hat{a}_3^2$ of the transmitting symbol vector component. The second detection estimate together with the above known signals $\hat{a}_1$ and $\hat{a}_2^1$ form the second update estimate $\hat{a}_M^2, \hat{a}_{M-1}^2, \ldots, \hat{a}_3^2, \hat{a}_2^1, \hat{a}_1$. Similar performances are executed till the $(M-1)$-th update estimate $\hat{a}_M^{M-1}$, $$\hat{a}_{M-1}^{M-2}, \ldots, \hat{a}_2^1,$$

$\hat{a}_1$ is obtained. This $(M-1)$-th update estimate is just the final detection result.

The V-BLAST detection method disclosed by D2 can, over the Ordering SIC V-BLAST detection method disclosed by D1, further reduce error propagation between the V-BLAST layers, so that the detecting performance of V-BLAST is improved to a certain extent. However, the detecting procedure is too complicated, and still has inter-layer error propagation. Its error performance is still restricted to a certain extent.

SUMMARY OF THE INVENTION

With regard to the aforesaid two existing detection methods, the present invention proposes a V-BLAST detection method capable of further reducing V-BLAST inter-layer error propagation so that the error code performance can be further improved.

According to the V-BLAST detection method for a MIMO system, including:

a first detecting step for acquiring in sequence the old detection components of a transmitting symbol vector with the optimum ordering-successive interference cancellation detection method;

a second detecting step for taking the detection component with the highest space diversity degree among the old detection components as a first new detection component, and acquiring in sequence the other new detection components of the transmitting symbol vector in an inverse order of optimum detection order with the optimum ordering-successive interference cancellation detection method;

an outputting step for outputting the first new detection component and the other new detection components as the final detection result.

The present invention also provides a V-BLAST detection device for a MIMO system, including:

a first detecting means for acquiring in sequence the old detection components of a transmitting symbol vector with the optimum ordering-successive interference cancellation detection method;

a second detecting mean for selecting the detection component with the highest space diversity degree among the old detection components as a first new detection component, and acquiring in sequence the other new detection components of the transmitting symbol vector in an inverse order of the optimum detection order with the optimum ordering-successive interference cancellation detection method;

an outputting means for outputting the first new detection component and the other new detection components as the final detection result.

The present invention also provides a receiving device at network side comprising the above-mentioned V-BLAST detection device.

The present invention also provides a receiving device at user side comprising the above-mentioned V-BLAST detection device.

The V-BLAST detection method and the V-BLAST detection device according to the present invention can suppress the inter-layer error propagation of V-BLAST better and hence remarkably improve the error code performance of V-BLAST.

PREFERRED EMBODIMENTS

The V-BLAST detection method and device according to the invention will be described in detail in conjunction with the drawings.

Figure 1:
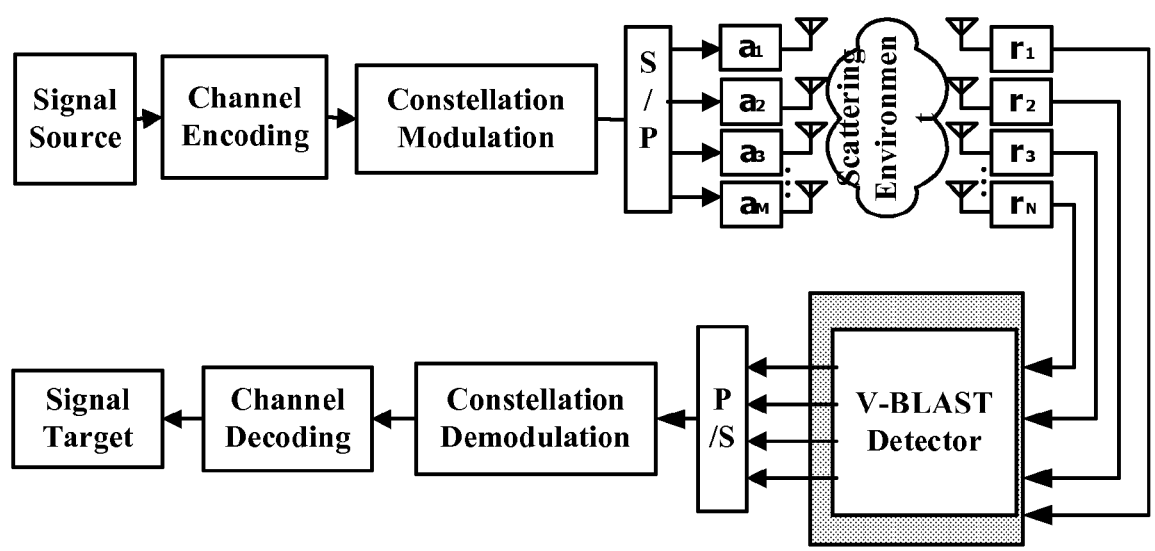
FIG. 1 is a schematic diagram of a MIMO system based on V-BLAST scheme.

FIG. 1 shows a MIMO system in which signals are detected with the V-BLAST detection method according to the invention. As stated above, this system has M transmitting antennae and N receiving antennae, wherein $1<M\leq N$. Within a symbol time, $a1, a2, \ldots, aM$ are used to represent the components of the transmitting symbol vector a transmitted from the transmitting antennae respectively, wherein the transmitting symbol vector $a=(a_1,a_2,\ldots,a_M)^T$ represents a vector with M rows and 1 column obtained by transposing the vector $(a_1,a_2,\ldots,a_M)$.

Figure 2:
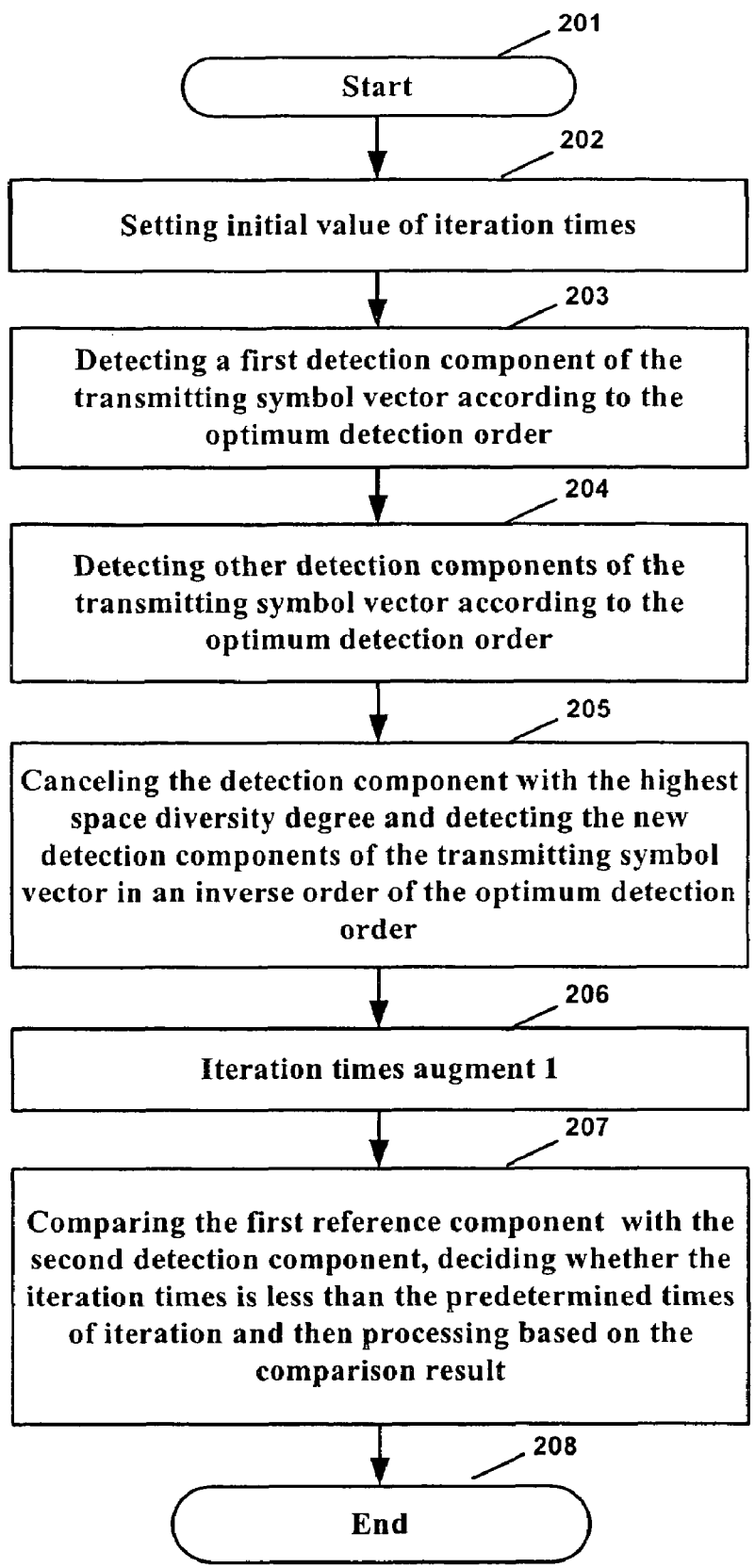
FIG. 2 is a flow chart of a V-BLAST detection method according to the invention.

The V-BLAST detection method according to the invention is, on the basis of the aforesaid Ordering-SIC V-BLAST detection method, realized by further introducing outer close loop iteration steps. FIG. 2 shows a flow chart of the V-BLAST detection method according to the invention.

As shown in FIG. 2, the method starts at step 201. In step 202, the initial value of iteration times is set as 0.

After that, the procedure comes to step 203. In step 203, the first detection component of the transmitting symbol vector a is, above all, detected by using the above Ordering-SIC V-BLAST detection method according to the optimum detection order. The first detection component of the transmitting symbol vector a that is firstly detected is represented as $\hat{a}_M^{old}$, which serves as the first reference component. In this step, the optimum detection order is represented as $k_1, k_2, \ldots, k_{M-1}, k_M$, a certain permutation of $M, M-1, \ldots, 2, 1$. In this embodiment, the optimum detection order is assumed to be $M, M-1, \ldots 2, 1$.

Then, the procedure comes to step 204. In step 204, based on the first detection component as detected in step 203, i.e. the first reference component $\hat{a}_M^{old}$, other detection components are detected in sequence by using Ordering-SIC V-BLAST detection method according to the optimum detection order. The other detection components, which are represented as $$\hat{a}_{M-1}^{old}, \ldots, \hat{a}_2^{old},$$

$\hat{a}_1$, together with the first detection component $\hat{a}_M^{old}$, form the detection components of the transmitting symbol vector, represented as $$\hat{a}_M^{old}, \hat{a}_{M-1}^{old}, \ldots, \hat{a}_2^{old}, \hat{a}_1.$$

Next, the procedure shown in FIG. 2 comes to step 205. In step 205, based on the detection components of the transmitting symbol vector detected in steps 203 and 204, the detection component $\hat{a}_1$ with the highest space diversity degree, which is taken as a known signal, is cancelled from the receiving symbol vector r by using the above Ordering-SIC V-BLAST detection method. And other detection components of the transmitting symbol vector are detected in sequence in an inverse of the optimum detecting sequence. The other detection components are called as other new detection components and represented as $$\hat{a}_2^{new}, \hat{a}_3^{new}, \ldots, \hat{a}_{M-1}^{new}, \hat{a}_M^{new},$$

wherein $\hat{a}_M^{new}$ is a new detection component that is finally detected and is named as the second reference component. Thus, the first iteration is completed. The aforesaid detection component $\hat{a}_1$ with the highest space diversity degree served as a known signal and the aforesaid other new detection components $$\hat{a}_2^{new}, \hat{a}_3^{new}, \ldots, \hat{a}_{M-1}^{new}, \hat{a}_M^{new}$$

constitute in common the new detection components of the transmitting symbol vector, which are represented as $\hat{a}_1$, $\hat{a}_2^{new}, \ldots,$ $$\hat{a}_{M-1}^{new}, \hat{a}_M^{new}.$$

After that, the procedure comes to step 206. In step 206, the times of iteration augment 1. After step 206, the procedure comes to the comparing and processing step 207.

In the comparing and processing step 207, the new detection component that is finally detected in step 205, i.e. the second reference component $\hat{a}_M^{new}$, is compared with the first detection component that is firstly detected in step 203, i.e. the first reference component $\hat{a}_M^{old}$. When both are not equal, it is further decided whether the times of iteration is already greater than or equal to the predetermined times of iteration, and the corresponding processing is respectively carried out according to respective result of comparison and decision.

The procedure shown in FIG. 2 ends at step 208.

Figure 3:
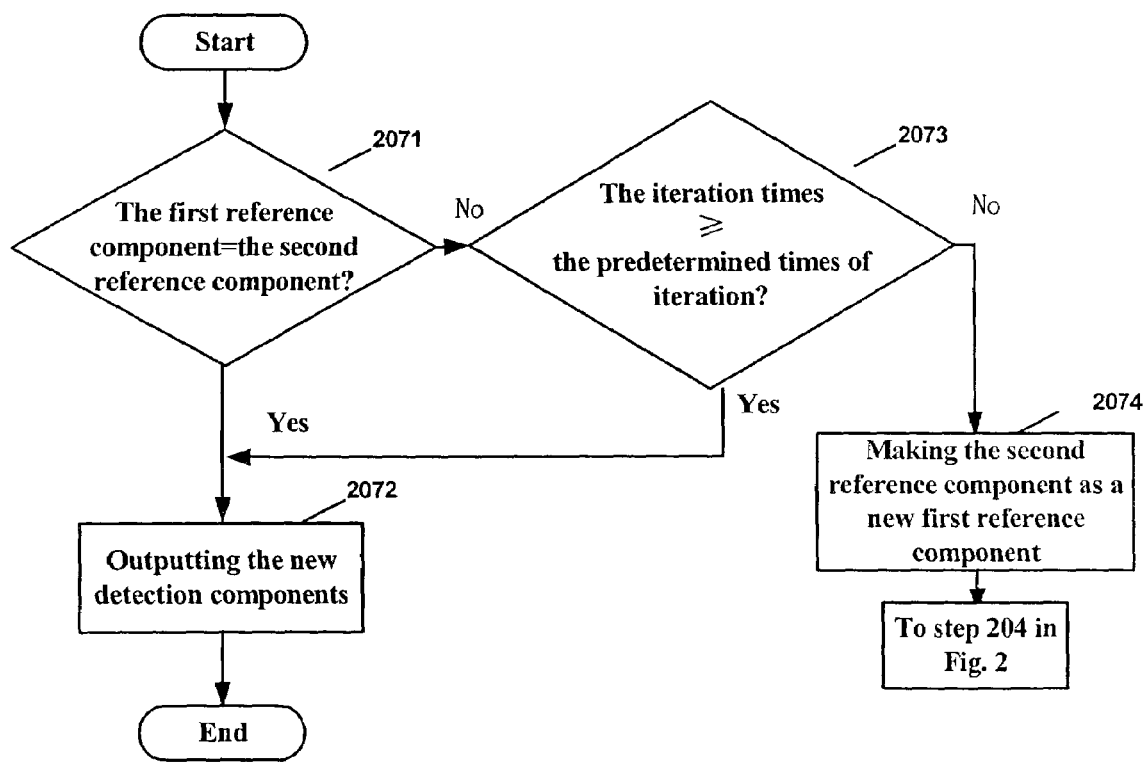
FIG. 3 is a detailed flow chart of the comparing step in the V-BLAST detection method according to the invention shown in FIG. 2.

The detailed steps of the comparing and processing step 207 shown in FIG. 2 are illustrated in FIG. 3. Step 207 includes step 2071 to step 2074. In step 2071, the second reference component $\hat{a}_M^{new}$ is compared with the first reference component $\hat{a}_M^{old}$ to see whether they are equal. When both are equal, the procedure comes to step 2072. In step 2072, the new detection components $$\hat{a}_M^{new}, \hat{a}_{M-1}^{new}, \ldots, \hat{a}_2^{new},$$

$\hat{a}_1$, of the transmitting symbol vector that is obtained in outputting step 205 are taken as the final detection result. Step 207 ends. When the second reference component $\hat{a}_M^{new}$ is not equal to the first reference component $\hat{a}_M^{old}$ in step 2071, the procedure comes to step 2073. In step 2073, it is determined whether the times of iteration is already greater than or equal to the predetermined times of iteration. When it is decided the time of iteration is already greater than or equal to the predetermined times of iteration, the procedure comes to step 2072. Otherwise, the procedure comes to step 2074. In step 2074, the second reference component $\hat{a}_M^{new}$ is changed to be a new first reference component $\hat{a}_M^{old}$. After that, the procedure returns to step 204 shown in FIG. 2. In step 204, the following detection is carried out as the new first reference component $\hat{a}_M^{old}$ being the first detection component.

It can be seen from the above description that the space diversity degrees of the new detection components $$\hat{a}_M^{new}, \hat{a}_{M-1}^{new}, \ldots, \hat{a}_2^{new}$$

of the transmitting symbol vector that are obtained in step 205 of each iteration according to the V-BLAST detection method of the invention are higher than those of the detection components $$\hat{a}_M^{old}, \hat{a}_{M-1}^{old}, \ldots, \hat{a}_2^{old}$$

of the transmitting symbol vector that are obtained in step 204, so the former has an accuracy higher than the latter. When both have different detection results, the latter is replaced by the former. And on this basis the whole detection procedure is repeated to form a close loop iteration, such that the accuracy of the detection can be further improved. When both have the same detection results, the iteration procedure is terminated.

It should be understood that in the procedure shown in FIG. 2, step 202, step 206 and step 2073 in step 207 for calculating the time of iteration and deciding only serve as auxiliary steps of the iteration detection procedure. These steps do not intend to restrict the detection method of the invention. Preferably, in actual application, the times of iteration may be set to guarantee the convergence of iteration procedure in order to prevent the unanticipated situation of non-convergent iteration. For example, the times of iteration is set as one of 2-10, preferably as 3.

Figure 4:
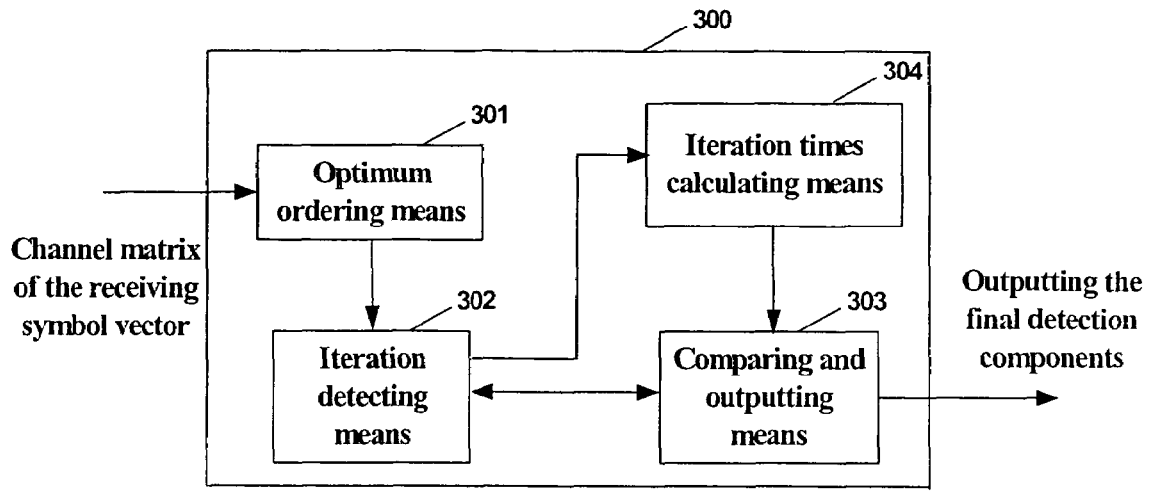
FIG. 4 is a schematic diagram of the structure of the V-BLAST detection device according to the invention.

The present invention also provides a V-BLAST detection device. FIG. 4 is a schematic diagram showing the structure of the V-BLAST detection device 300 according to the invention. It can be seen from FIG. 4 that the V-BLAST detection device 300 according to the invention comprises an optimum ordering means 301, an iteration detecting means 302 and a comparing and outputting means 303.

The receiving symbol vector r and the channel matrix H are input to the optimum ordering means 301. The optimum ordering means 301 obtains the optimum detection order according to the optimum ordering method and sends the optimum detection order to the iteration detecting means 302, wherein the optimum detection order is represented as $k_1$, $k_2, \ldots, k_{M-1}, k_M$, a certain permutation of M, M−1, . . . 2, 1. In this embodiments, the optimum detection order is assumed to be M, M−1, . . . 2, 1.

The iteration detecting means 302 detects in sequence M detection components of the transmitting symbol vector by using the Ordering-SIC V-BLAST detection method disclosed in D1 according to the optimum detection order obtained from the optimum ordering means 301. The M detection components are represented as $$\hat{a}_M^{old}, \hat{a}_{M-1}^{old}, \ldots, \hat{a}_2^{old}, \hat{a}_1,$$

wherein the first detection component of the transmitting symbol vector that is firstly detected is represented as $\hat{a}_M^{old}$ and serves as the first reference component.

Then, the iteration detecting means 302 cancels the detection component $\hat{a}_1$ with the highest space diversity degree among the aforesaid detected M detection components $$\hat{a}_M^{old}, \hat{a}_{M-1}^{old}, \ldots, \hat{a}_1,$$

which as a known signal, from the receiving symbol vector r. And other detection components of the transmitting symbol vector are detected in sequence in an inverse of the received optimum detection order by using the aforesaid Ordering-SLC V-BLAST detection method. The other detection components are called as other new detection components and are represented as $$\hat{a}_2^{new}, \hat{a}_3^{new}, \ldots, \hat{a}_{M-1}^{new}, \hat{a}_M^{new},$$

wherein $\hat{a}_M^{new}$ is a new detection component that is finally detected and is named as the second reference component. The aforesaid detection component $\hat{a}_1$ that is firstly cancelled as a known signal and the aforesaid other new detection components $$\hat{a}_2^{new}, \hat{a}_3^{new}, \ldots, \hat{a}_{M-1}^{new}, \hat{a}_M^{new}$$

constitute in common the new detection components of the transmitting symbol vector, which are represented as $$\hat{a}_1, \hat{a}_2^{new}, \ldots, \hat{a}_{M-1}^{new}, \hat{a}_M^{new}.$$

The iteration detecting means 302 completes iteration calculation once. The iteration detecting means 302 transmits the first reference component $\hat{a}_M^{old}$ and the second reference component $\hat{a}_M^{new}$ to the comparing and outputting means 303.

In the comparing and outputting means 303, the second reference component $\hat{a}_M^{new}$ is compared to the first reference component $\hat{a}_M^{old}$. If both are equal, the comparing and outputting means 303 reads from the iteration detecting means 302 the new detection components $\hat{a}_1$, $$\hat{a}_2^{new}, \ldots, \hat{a}_{M-1}^{new}, \hat{a}_M^{new}$$

of the transmitting symbol vector and outputs them as the final detection result. When both are not equal, the comparing and outputting means 303 feeds the second reference component $\hat{a}_M^{new}$ into the iteration detecting means 302 as a new first reference component $\hat{a}_M^{old_1}$. The iteration detecting means 302 takes this new first reference component $\hat{a}_M^{old_1}$ as the first detection component during detection. The following detection is carried out according to the aforesaid operation.

It should be understood that the above operation of feeding the new first reference component $\hat{a}_M^{old_1}$ into the iteration detecting means 302 can also be carried out by the comparing and outputting means 303 sending an instruction of changing the first reference component $\hat{a}_M^{old}$ to the iteration means 302 and then the iteration detecting means 302 changing it according to the instruction. The specific way in which the iteration detecting means 302 obtains a new first reference component does not constitute restriction to the present invention.

The V-BLAST detection device 300 according to the invention shown in FIG. 4 may also include iteration times calculating means 304 that calculates the times of iteration and thereby controls the procedure of V-BLAST detection. As shown in FIG. 4, iteration detecting means 302 will feed an instruction of increasing the times of iteration into the iteration times calculating means 304 after each iteration calculation is completed, then the iteration times calculating means 304 adds one to the times of iteration recorded therein.

When the comparing and outputting means 303 makes comparison, it will, first of all, compare the second reference component $\hat{a}_M^{new}$ and the first reference component $\hat{a}_M^{old}$. When both are not equal, the comparing and outputting means 303 reads the times of iteration recorded in the iteration times calculating means 304, and decides whether the recorded times of iteration is greater than or equal to the predetermined times of iteration. When the recorded times of iteration is equal to or greater than the predetermined times of iteration, the comparing and outputting means 303 reads from the iteration detecting means 302 the new detection components $$\hat{a}_1, \hat{a}_2^{new}, \ldots, \hat{a}_{M-1}^{new}, \hat{a}_M^{new}$$

of the transmitting symbol vector and outputs them as the final detection result. When the times of iteration recorded in the iteration times calculating means 304 is less than the predetermined times of iteration, the comparing and outputting means 303 will feed the second reference component $\hat{a}_{M^{new}}$ into the iteration detecting means 302 as a new first reference component $\hat{a}_M^{old_1}$. The iteration detecting means 302 takes this new first reference component $\hat{a}_M^{old_1}$ as the first detection component during detection. The following detection is carried out according to the aforesaid operation.

In comparison with the prior detection method, the V-BLAST detection method and device according to the invention can suppress inter-layer error propagation of V-BLAST better. Thereby the error code performance of V-BLAST can be improved greatly, which can be verified in computer emulation. At the same time, although the complexity of calculation of the V-BLAST detection method according to the invention is almost doubled over the aforesaid Ordering-SLC V-BLAST detection method, the error code performance is remarkably improved. In comparison with the V-BLAST detection method disclosed by D2, however, the complexity of V-BLAST detection method according to the invention is reduced to a certain extent.

Figure 5:
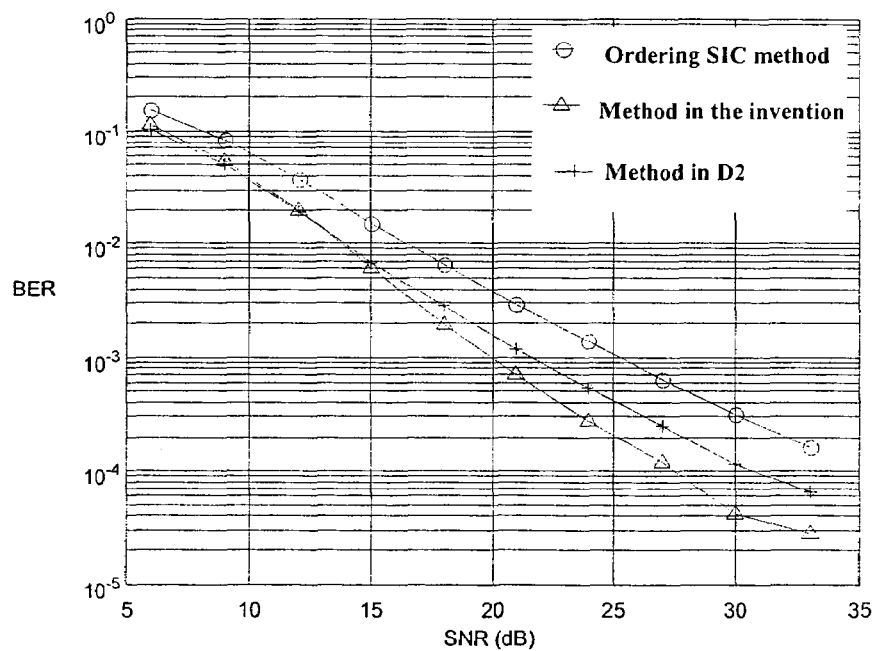
FIG. 5 illustrates an emulate effect diagram of the V-BLAST detection method according to the invention, the Ordering-SIC V-BLAST detection method disclosed by D1 and the V-BLAST detection method disclosed by D2.

The emulation results of the above three V-BLAST detection methods are shown in FIG. 5. During emulation, a V-BLAST with four transmitting antennae and four receiving antennae is adopted. The MIMO channel is a flat independent Rayleigh fading channel and the category of constellation modulation is QPSK. No channel encoding is used during emulation. The maximum times of iteration is set to be 3. It can be seen from this figure that when BER is 0.0001, the performance of the V-BLAST detection method according to the invention is increased about 3 dB than that of the V-BLAST detection method disclosed by D2, while increased about 5 dB than that of the Ordering-SLC V-BLAST detection method. Therefore, in comparison with these existing detection methods, the error code performance of the V-BLAST detection method and device according to the invention can be greatly improved.

On the other hand, where the complexity of method is concerned, it can be seen from the description of FIG. 2 that the V-BLAST detection method according to the invention enables, on the basis of the Ordering-SLC V-BLAST detection method, the Moore-Penrose pseudoinverse operation of a zero H matrix as calculated in the first iteration to be used repeatedly in the following iteration(s). Therefore, where a V-BLAST with four transmitting antennae and four receiving antennae is concerned, it needs seven times of operations for calculating the Moore-Penrose pseudoinverse. The V-BLAST detection method disclosed by D2 needs ten times of operations for calculating the Moore-Penrose pseudoinverse. The Moore-Penrose pseudoinverse operation accounts for most of the total complexity. Meanwhile, the computer emulation indicates that the times of iteration of outer close loop are generally small, which is about one to three times. Therefore, in comparison with the V-BLAST detection method disclosed by D2, the V-BLAST detection method and device according to the invention has a reduced complexity to a certain extent.

Various other changes and modifications can be made without departing from the scope and spirit of the present invention. It should be understood that the invention is not limited to particular embodiments, the scope of the invention is defined by the appended claims.

The invention claimed is:

1. A V-BLAST (Vertical Bell Laboratories Space-Time codes) detection method for a MIMO (Multiple Input Multiple Output) system, including:

a first detecting step for acquiring in sequence the old detection components $$(\hat{a}_M^{old}, \hat{a}_{M-1}^{old}, \ldots, \hat{a}_1, \text{where } M \text{ is an integer})$$

of a transmitting symbol vector (a) with the optimum ordering-successive interference cancellation detection method;

a second detecting step for taking the detection component ($\hat{a}_1$) with the highest space diversity degree among the old detection components $$(\hat{a}_M^{old}, \hat{a}_{M-1}^{old}, \ldots, \hat{a}_1)$$

as a first new detection component, and acquiring in sequence other new detection components $$(\hat{a}_2^{new}, \hat{a}_3^{new}, \ldots, \hat{a}_{M-1}^{new}, \hat{a}_M^{new})$$

of said transmitting symbol vector (a) in an inverse order of optimum detection order with the optimum ordering-successive interference cancellation detection method;

an outputting step for outputting said first new detection component ($\hat{a}_1$) and said other new detection components $$(\hat{a}_2^{new}, \hat{a}_3^{new}, \ldots, \hat{a}_{M-1}^{new}, \hat{a}_M^{new})$$

as the final detection result.

2. The detection method according to claim 1, further includes between the second detecting step and the outputting step:

a first comparing step for comparing the first old detection component ($\hat{a}_M^{old}$) which is firstly acquired in the first detecting step and the last new detection component ($\hat{a}_M^{new}$) which is finally acquired in the second detecting step;

a first replacing step for making said first old detection component ($\hat{a}_M^{old}$) equal to the value of the last new detection component ($\hat{a}_M^{new}$) if the first old detection component ($\hat{a}_M^{old}$) is not equal to the last new detection component ($\hat{a}_M^{new}$) and then returning to said first detecting step, otherwise coming to said outputting step.

3. The detection method according to claim 1, further includes between the second detecting step and the outputting step:

a second comparing step for comparing the times of performing the first detecting step and the second detecting step and a predetermined times of iteration;

a second replacing step for making said first old detection component ($\hat{a}_M^{old}$) equal to the value of the last new detection component ($\hat{a}_M^{new}$) if the times of performing the first detecting step and the second detecting step is less than the predetermined times of iteration and then returning to said first detecting step, otherwise coming to said outputting step.

4. The detection method according to claim 3, wherein said predetermined times of iteration is set to be any one of 2-10.

5. The detection method according to claim 4, wherein said predetermined times of iteration is set to be 3.

6. The detection method according to any of claims 1-5, wherein said second detecting step comprises the steps of:

canceling said first new detection component ($\hat{a}_1$) as a known signal from the current receiving symbol vector (r), the resultant receiving symbol vector then being the current receiving symbol vector (r);

setting, in an inverse order of the optimum detection order, a column in the channel matrix corresponding to said known signal component as zero to obtain a zero channel matrix and further acquiring a Moore-Penrose pseudoinverse channel matrix of said zero channel matrix;

forming a linear combination of said current receiving symbol vector(r) with the column vector of said Moore-Penrose pseudoinverse channel matrix corresponding to the next detection component just following said known signal to obtain an estimated value of said detection component;

constellation demodulating the estimated value of said detection component to obtain said detection component of said transmitting symbol vector (a) and taking it as a known signal; and repeating the above steps and obtaining in sequence said other new detection components $$(\hat{a}_2^{new}, \hat{a}_3^{new}, \ldots, \hat{a}_{M-1}^{new}, \hat{a}_M^{new})$$

of said transmitting symbol vector (a).

7. A V-BLAST (Vertical Bell Laboratories Space-Time codes) detection device for a MIMO (Multiple Input Multiple Output) system, including:

a first detecting means for acquiring in sequence the old detection components $(\hat{a}_M^{old}, \hat{a}_{M-1}^{old}, \ldots, \hat{a}_1,$ where $M$ is an integer$)$ of a transmitting symbol vector (a) with the optimum ordering-successive interference cancellation detection method;

a second detecting mean for selecting the detection component ($\hat{a}_1$) with the highest space diversity degree among the old detection components $(\hat{a}_M^{old}, \hat{a}_{M-1}^{old}, \ldots, \hat{a}_1)$ as a first new detection component, and acquiring in sequence other new detection components $(\hat{a}_2^{new}, \hat{a}_3^{new}, \ldots, \hat{a}_{M-1}^{new}, \hat{a}_M^{new})$ of said transmitting symbol vector (a) in an inverse order of the optimum detection order with the optimum ordering-successive interference cancellation detection method;

an outputting means for outputting said first new detection component ($\hat{a}_1$) and said other new detection components $(\hat{a}_2^{new}, \hat{a}_3^{new}, \ldots, \hat{a}_{M-1}^{new}, \hat{a}_M^{new})$ as the final detection result.

8. The detection device according to claim 7, further comprising:

a first comparing means for comparing the first old detection component ($\hat{a}_M^{old}$) which is firstly acquired in the first detecting means and the last new detection component ($\hat{a}_M^{new}$) which is finally acquired in the second detecting means;

a first replacing means for making said first old detection component ($\hat{a}_M^{old}$) equal to the value of the last new detection component ($\hat{a}_M^{new}$) if the first old detection component ($\hat{a}_M^{old}$) is not equal to the last new detection component ($\hat{a}_M^{new}$) and then sending the resultant new first old detection component ($\hat{a}_M^{old}$) to the first detecting means, which will performs iteration detections together with the second detecting means, otherwise transmitting to said outputting means an instruction signal for outputting the final detection result.

9. The detection device according to claim 7, further comprising:

a second comparing means for comparing the detection times performed by the first detecting means together with the second detecting means and a predetermined times of iteration;

a second replacing means for making said first old detection component ($\hat{a}_M^{old}$) equal to the value of the last new detection component ($\hat{a}_M^{new}$) if the detection times performed by the first detecting means and the second detecting means is less than the predetermined times of iteration and then sending the resultant new first old detection component ($\hat{a}_M^{old}$) to the first detecting means, which will performs iteration detections together with the second detecting means, otherwise transmitting to said outputting means an instruction signal for outputting the final detection result.

10. The detection device according to claim 9, wherein said predetermined times of iteration is set to be any one of 2-10.

11. The detection device according to claim 10, wherein said predetermined times of iteration is set to be 3.

12. A receiving device at network side comprising the V-BLAST detection device as claimed in claim 7.

13. A receiving device at user side comprising the V-BLAST detection device as claimed in claim 7.

* * * * *